United States Patent
Kim

(10) Patent No.: US 10,705,540 B2
(45) Date of Patent: Jul. 7, 2020

(54) APPARATUS FOR CONTROLLING PLATOONING BASED ON WEATHER INFORMATION, SYSTEM INCLUDING THE SAME, AND METHOD THEREOF

(71) Applicants: HYUNDAI MOTOR COMPANY, Seoul (KR); KIA MOTORS CORPORATION, Seoul (KR)

(72) Inventor: Sang Jun Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 198 days.

(21) Appl. No.: 15/978,847

(22) Filed: May 14, 2018

(65) Prior Publication Data

US 2019/0179338 A1    Jun. 13, 2019

(30) Foreign Application Priority Data

Dec. 12, 2017   (KR) .................. 10-2017-0170409

(51) Int. Cl.
*G05D 1/02*   (2020.01)
*B60W 30/165*   (2020.01)
(Continued)

(52) U.S. Cl.
CPC .......... *G05D 1/0293* (2013.01); *B60W 30/165* (2013.01); *B60W 30/17* (2013.01); *G05D 1/0212* (2013.01); *G05D 1/0246* (2013.01); *G05D 1/0276* (2013.01); *G05D 1/0295* (2013.01); *G08G 1/22* (2013.01); *B60W 50/14* (2013.01); *B60W 2050/146* (2013.01); *B60W 2300/125* (2013.01); *B60W 2420/42* (2013.01); *B60W 2420/52* (2013.01); *B60W 2552/40* (2020.02); *B60W 2554/00* (2020.02);
(Continued)

(58) Field of Classification Search
CPC .. G05D 1/0293; G05D 1/0212; G05D 1/0246; G05D 1/0276; G05D 1/0295; B60W 30/165; B60W 30/17; G08G 1/22
See application file for complete search history.

(56) References Cited

U.S. PATENT DOCUMENTS 9,616,743 B1 * 4/2017 Mays .................. B60W 30/165
9,645,579 B2   5/2017 Switkes et al.
(Continued)

FOREIGN PATENT DOCUMENTS

| JP | 3906768 B2 | 4/2007 |
| KR | 2017-0016177 A | 2/2017 |
| WO | 2017-035516 A1 | 3/2017 |

*Primary Examiner* — Hussein Elchanti
(74) *Attorney, Agent, or Firm* — Morgan, Lewis & Bockius LLP

(57) ABSTRACT

An apparatus for controlling platooning based on weather information includes a processor configured to determine a weather environment state on a platooning path based on weather forecast information received from a control center or weather information measured by a vehicle sensor, determine a sequence of platooning based on the weather environment state, determine a level of the platooning based on the weather environment state, and perform control of a transverse vehicle-to-vehicle distance or control of a longitudinal vehicle-to-vehicle distance of a vehicle based on the measured weather information and the determined level of the platooning.

19 Claims, 7 Drawing Sheets

(51) Int. Cl.
  *B60W 30/17*  (2020.01)
  *G08G 1/00*  (2006.01)
  *H04W 4/46*  (2018.01)
  *B60W 50/14*  (2020.01)

(52) U.S. Cl.
  CPC ..... *B60W 2555/20* (2020.02); *B60W 2556/50* (2020.02); *B60W 2556/65* (2020.02); *B60W 2754/30* (2020.02); *G05D 1/0257* (2013.01); *G05D 1/0278* (2013.01); *G05D 2201/0213* (2013.01); *H04W 4/46* (2018.02)

(56) References Cited

U.S. PATENT DOCUMENTS

| | | | |
|---|---|---|---|
| 2008/0167774 A1* | 7/2008 | Patel | G08G 1/20 |
| | | | 701/36 |
| 2010/0256852 A1 | 10/2010 | Mudalige | |
| 2016/0362048 A1* | 12/2016 | Matthews | G08G 1/096775 |
| 2017/0036601 A1* | 2/2017 | Kimura | B60R 1/00 |
| 2017/0344023 A1 | 11/2017 | Laubinger et al. | |
| 2018/0188725 A1* | 7/2018 | Cremona | G05D 1/0295 |
| 2018/0188745 A1* | 7/2018 | Pilkington | G05D 1/0295 |

\* cited by examiner

APPARATUS FOR CONTROLLING PLATOONING BASED ON WEATHER INFORMATION, SYSTEM INCLUDING THE SAME, AND METHOD THEREOF

CROSS-REFERENCE TO RELATED APPLICATION

This application is based on and claims the benefit of priority to Korean Patent Application No. 10-2017-0170409, filed on Dec. 12, 2017, in the Korean Intellectual Property Office, the entire disclosure of which is incorporated herein by reference.

TECHNICAL FIELD

The present disclosure relates to an apparatus for controlling platooning based on weather information, a system including the same, and a method thereof, and more particularly, to a technology of performing control of a level of platooning, a longitudinal control, and a transverse control based on the weather information.

BACKGROUND

Platooning refers to a case in which a vehicle travels while following a leading vehicle, and platooning vehicles transmit and receive various travel information through vehicle-to-vehicle (V2V) communication to control speeds of the vehicles and inter-vehicle intervals between the vehicles, allowing the vehicles to maintain a specific distance between the vehicles.

However, a danger of an accident increases while platooning is controlled if weather conditions or road conditions deteriorate during the platooning, a more careful attention has to be paid in the control of the platooning.

Because the current platooning control method does not reflect such as weather or road conditions, it is difficult to cope with an urgent situation during emergent braking.

SUMMARY

The present disclosure provides an apparatus for controlling platooning based on weather information that may improve a safety of driving by performing control of a level of platooning, a longitudinal control, and a transverse control in consideration of the weather information, a system including the same, and a method thereof.

The technical objects of the present disclosure are not limited to the above-mentioned one, and the other unmentioned technical objects will become apparent to those skilled in the art from the following description.

In accordance with an aspect of the present disclosure, an apparatus for controlling platooning includes a processor configured to determine a weather environment state on a platooning path based on weather forecast information received from a control center or weather information measured by a vehicle sensor, determine a sequence of platooning based on the weather environment state, determine a level of the platooning based on the weather environment state, and perform control of a transverse vehicle-to-vehicle distance or control of a longitudinal vehicle-to-vehicle distance of a vehicle based on the measured weather information and the determined level of the platooning.

According to an embodiment, the processor may be further configured to determine a level of a road based on the measured weather information.

According to an embodiment, the processor may be further configured to control the longitudinal vehicle-to-vehicle distance according to the determination result of the level of the road.

According to an embodiment, the processor may be further configured to generate the platooning path, wherein the platooning path includes a merge point for the platooning.

According to an embodiment, the processor may be configured to determine that the weather environment state is a bad weather condition if the road is in a wet road surface state due to at least one of snow, rain, and hail in the platooning path.

According to an embodiment, the processor may be configured to determine the platooning sequence based on a platooning path, a fuel ratio, a braking force, and a weight of a load when the weather environment state is a normal condition, and determine the platooning sequence based on the braking force when the weather environment state is a bad condition.

According to an embodiment, the processor may be configured to select a vehicle having the weakest braking force as a leading vehicle when the weather environment state is a bad condition, and determine the sequence of the following vehicles in the sequence of the stronger braking forces.

According to an embodiment, the processor may be configured to classify the level of the platooning into a first level of not carrying out platooning, a second level of controlling a longitudinal vehicle-to-vehicle distance during the platooning, and a third level of controlling a longitudinal vehicle-to-vehicle distance, a transverse vehicle-to-vehicle distance, and steering during the platooning to determine the level of the platooning.

According to an embodiment, the processor may be configured to determine that the level of the platooning is the first level or the second level in the case in which the weather environment state is a bad condition, and determine that the level of the platooning is one of the third level, the second level, and the first level in the case in which the weather environment state is a normal condition.

According to an embodiment, the processor may be configured to determine a state of a traffic line of the road on the platooning path when the level of the platooning is the third level.

According to an embodiment, the processor may be configured to perform independent control for maintaining driving in the traffic line independently from a behavior of the leading vehicle in the case in which the traffic line state of the road is a first reference value or more, and perform control for following the leading vehicle in the case in which the traffic line state of the road is less than the first reference value.

According to an embodiment, the processor may be configured to determine the level of the road by using one or more of a slip rate of an electronic stability control (ESC) device and the traffic line state of the road according to the detection result of snow and rain by the vehicle sensor.

According to an embodiment, the processor may be configured to determine a first distance value as the longitudinal vehicle-to-vehicle distance in the case in which the level of the road is a second reference value or more, and determine a second distance value that is larger than the first distance value as the longitudinal vehicle-to-vehicle distance in the case in which the level of the road is less than the second reference value.

According to an embodiment, the processor may be configured to adjust the level of the platooning to the second level in the case in which the level of the road is less than the second reference value.

According to an embodiment, the processor may be configured to switch off one or more cameras on front and lateral sides of the vehicle in the case in which the level of the platooning is the second level and the level of the road is less than the second reference value.

In accordance with another embodiment of the present disclosure, a system for controlling platooning includes a communicating device configured to perform communication between platooning vehicles, a detector configured to detect weather information on a platooning path, and a platooning control apparatus configured to determine a weather environment state based on weather forecast information received from a control center or weather information detected by the detector and control platooning by determining a level of the platooning according to the weather environment state.

According to an embodiment, the platooning control apparatus may include a processor configured to generate a platooning path, determine a weather environment state on the platooning path based on the weather forecast information or the weather information, determine a sequence of platooning based on the weather environment state, determine a level of the platooning based on the weather environment state, perform control of a transverse vehicle-to-vehicle distance or a longitudinal vehicle-to-vehicle distance of a vehicle based on the detected weather information and the determined level of the platooning, and determine a level of a road based on the measured weather information.

In accordance with another aspect of the present disclosure, a method for controlling platooning includes determining, by a processor, a platooning sequence and a level of platooning based on weather forecast information received from a control center, determining, by the processor, a state of a traffic line of a road on a platooning path based on weather information measured by a vehicle sensor communicatively connected to the processor, performing, by the processor, control of a transverse vehicle-to-vehicle distance according to a state of the traffic line, determining, by the processor, a level of the road based on the weather information, and performing, by the processor, control of a longitudinal vehicle-to-vehicle distance according to a level of the road.

According to an embodiment, the performing of the control of the transverse vehicle-to-vehicle distance may include performing independent control for maintaining driving of the vehicle in the traffic line independently from a behavior of a leading vehicle in the case in which the traffic line state of the road is a first reference value or more, and performing control for following the leading vehicle in the case in which the traffic line state of the road is less than the first reference value.

According to an embodiment, the performing of the control of the longitudinal vehicle-to-vehicle distance may include determining a first distance value as a longitudinal vehicle-to-vehicle distance in the case in which the level of the road is a second reference value or more, and determining a second distance value that is larger than the first distance value as the longitudinal vehicle-to-vehicle distance in the case in which the level of the road is less than the second reference value.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
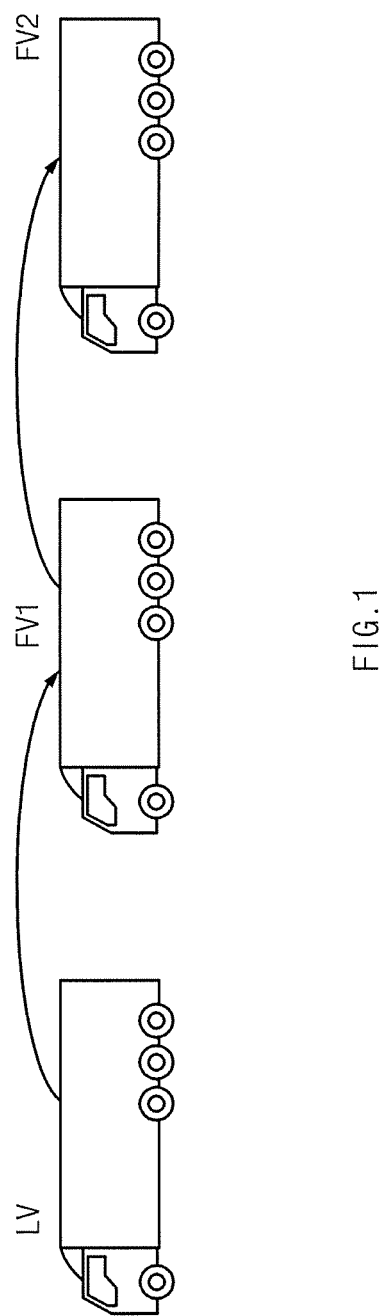
FIG. 1 is an illustrative view of platooning among vehicles according to an embodiment of the present disclosure.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

The present disclosure may determine a platooning level based on weather forecast information received from a control center, and may adjust the platooning level in consideration of weather information (including road information due to weather conditions) measured through a vehicle sensor even if the platooning level is an upper level or may perform a longitudinal control or a transverse control according to a state of a traffic line or a road even if the platooning level is an upper level. Then, the weather information may include information, such as a state in which a surface of a road is wet due to snow or rain, and may determine that the wet road surface state is a bad road condition.

Hereinafter, exemplary embodiments of the present disclosure will be described in detail with reference to FIGS. 1 to 7.

Figure 2:
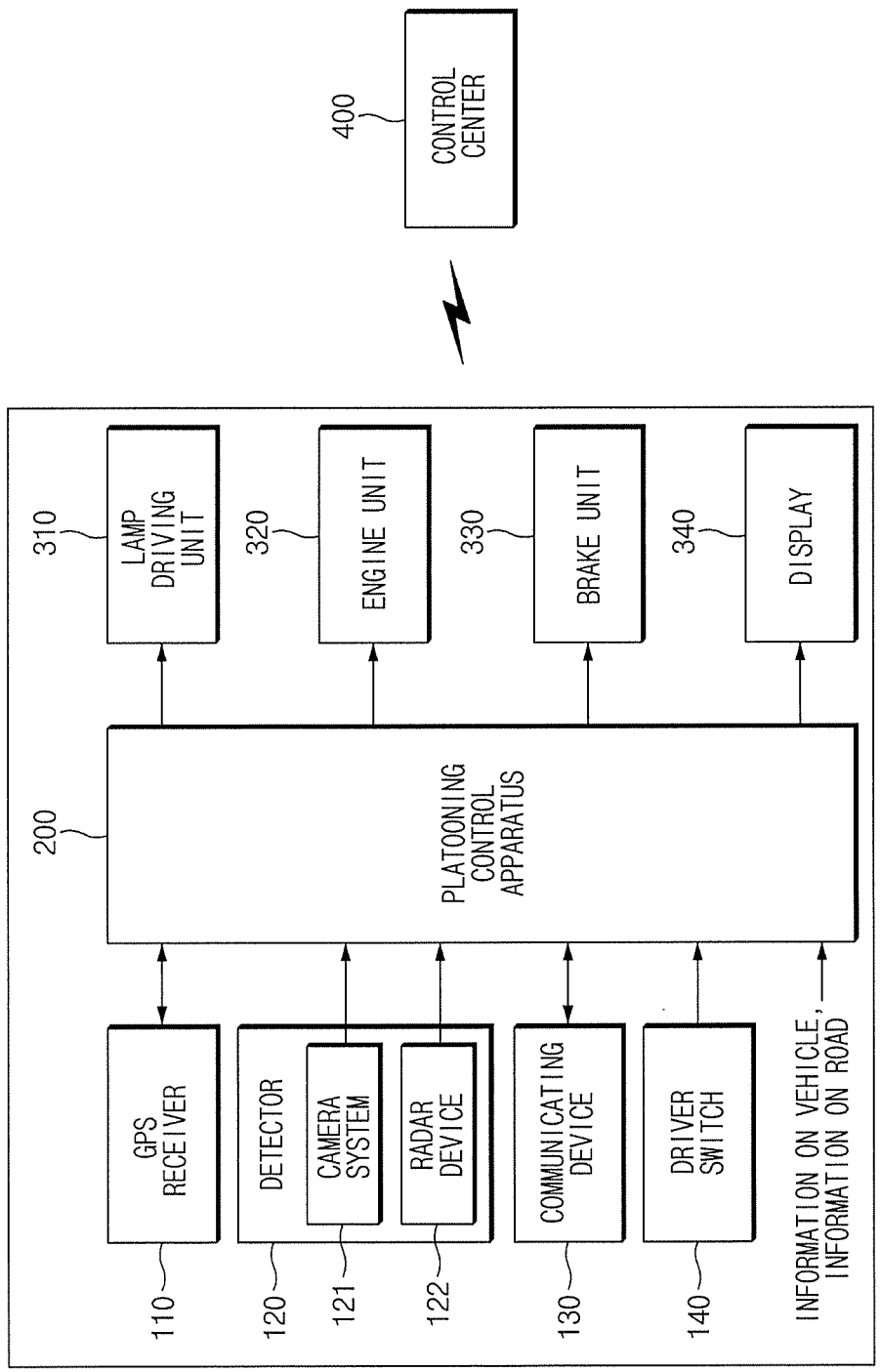
FIG. 2 is a block diagram showing a system for controlling platooning according to an embodiment of the present disclosure.
Figure 3:
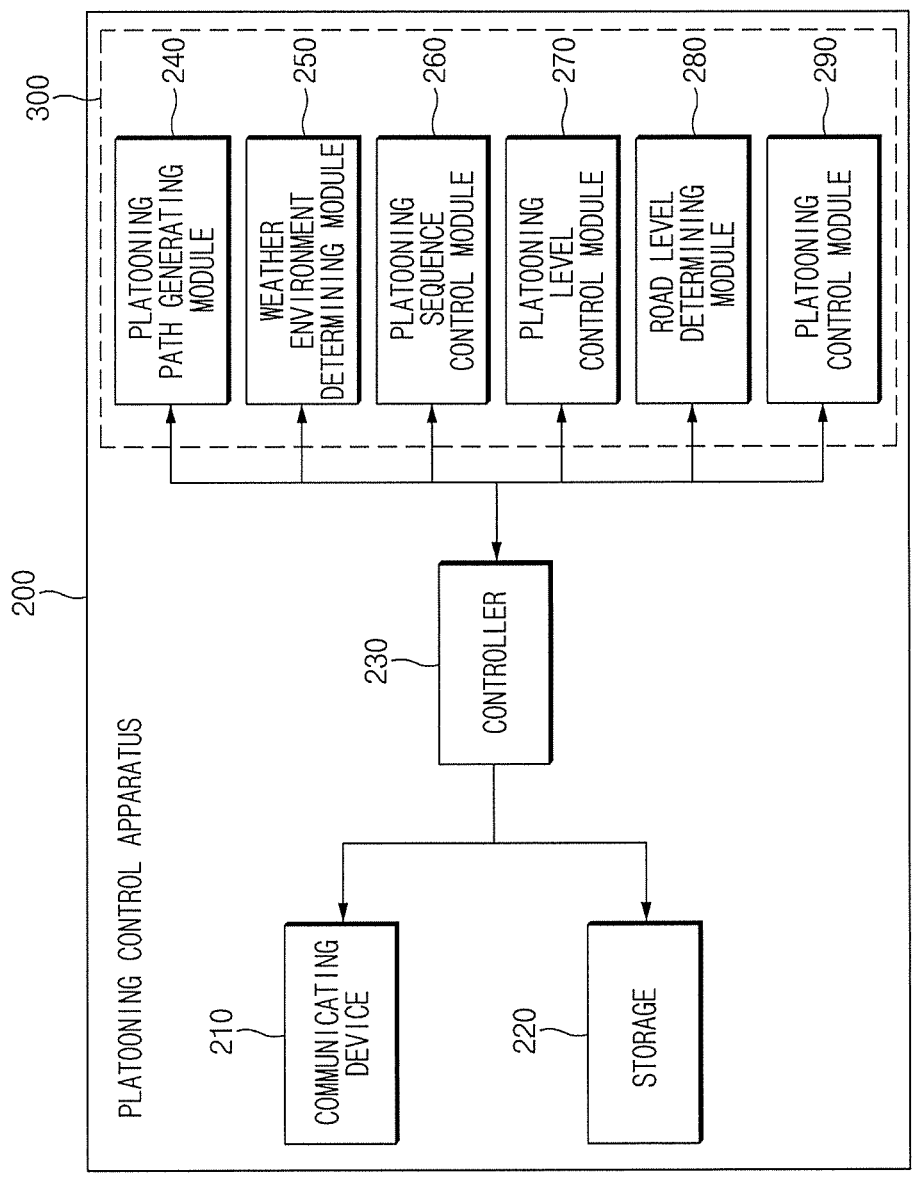
FIG. 3 is a block diagram showing a platooning control apparatus according to an embodiment of the present disclosure.

FIG. 1 is an illustrative view of platooning among vehicles according to an embodiment of the present disclosure. FIG. 2 is a block diagram showing a system for controlling platooning according to an embodiment of the present disclosure. FIG. 3 is a block diagram showing a platooning control apparatus according to an embodiment of the present disclosure.

Referring to FIG. 1, a plurality of vehicles forming a platoon at a specific interval while driving is called platooning. Then, a vehicle that travels on the foremost side is called a leading vehicle (LV), and vehicles that follow the leading vehicle are called following vehicles (FVs).

Referring to FIG. 2, a platooning control system according to an embodiment of the present disclosure may include a GPS receiver 110, a detector 120, a communicating device 130, a driver switch 140, a platooning control apparatus 200, a lamp driving unit 310, an engine unit 320, a brake unit 330, and a display 340, and may transmit and receive weather forecast information and platooning information from a control center 400.

The GPS receiver 110 may receive GPS information and provide the received GPS information to the platooning control apparatus 200 such that the platooning control apparatus 200 may recognize a location of a host vehicle.

The detector 120 may detect a state of a road ahead, a weather state, and the like, and includes a camera system 121 and a radar device 122. Because there is a high possibility of generating an error in image data of the camera system 121 when it snows or rains, the platooning control apparatus 200 may determine the state of the road and the weather state by using only data of the radar device 122 while switching off the camera system 121 when it snows or rains. Further, the detector 120 acquires relative distances and relative speeds of vehicles, traffic line information, and the like, and provides them to the platooning control apparatus 200.

The communicating device 130 is a hardware device implemented with various electronic circuits to transmit and receive signals via wireless connections. The communicating device 130 may perform vehicle-to-vehicle (V2V) communication, and may transmit and receive platooning related information, weather forecast information, and the like from the control center 400.

The driver switch 140 is switched on and off by the driver to inform a request for platooning or approval of platooning, and if receiving a request for platooning related agreement, such as a level of platooning or a platooning sequence, from a leading vehicle or the control center 400, the driver switches on or off the driver switch 140 to provide an opinion. When the driver switch 140 is switched on, it may be determined that the platooning is approved.

Further, vehicle load box related information and map and traffic situation information may be input to the platooning control apparatus 200.

The lamp driving unit 310 drives a vehicle lamp if receiving a command for driving of a lamp for controlling platooning from the platooning control apparatus 200. That is, the lamp driving unit 310 may drive the lamp corresponding to a turn signal, a stop signal, a platooning mode signal, and the like.

The engine unit 320 accelerates the vehicle if receiving a command for acceleration from the platooning control apparatus 200.

The brake unit 330 decelerates the vehicle if receiving a command for deceleration from the platooning control apparatus 200.

The display 340 may display platooning situation information, such as whether a platoon is formed, information on a leading vehicle, and information on inter-vehicle distances, and may include a cluster, a head-up display, a navigation terminal, and an audio, video, and navigation (AVN) device. Although FIG. 2 illustrates a configuration of displaying platooning situation information on the display 340 that is configured separately from the platooning control apparatus 200 as an example, the present disclosure is not limited thereto but a display provided in the platooning control apparatus 200 may display platooning situation information. The display 340 may include at least one of a liquid crystal display (LCD), a thin film transistor (TFT) LCD, a light emitting diode (LED), an organic LED, an active matrix OLED (AMOLED), a flexible display, a bended display, and a 3D display. Among them, some displays may be realized by transparent displays that are configured in a transparent or light-transmitting way such that the outside is visible.

The platooning control apparatus 200 may determine a weather environment state based on weather forecast information received from the control center or weather information detected by the detector, and may determine a level of platooning according to the weather environment state to control the platooning. Referring to FIG. 3, the platooning control apparatus 200 includes a communicating device 210, a storage 220, a controller 230, and a processor 300. The processor 160 has an associated non-transitory memory storing software instructions which, when executed by the processor 300, provides the functionalities of a platooning path generating module 240, a weather environment determining module 250, a platooning sequence control module 260, a platooning level control module 270, a road level determining module 280, and a platooning control module 290. The controller 230 is an electric circuitry that executes instructions of software which thereby performs various functions, and may process signals communicated between the processor 300 and the communicating device 210 and storage 220. The processor 300 may take the foam of one or more processor(s) and associated memory storing program instructions, and in some examples the one or more processor(s) may be used to implement the functions of both the controller 230 and the processor 300.

The communicating device 210 is a hardware device implemented with various electronic circuits to transmit and receive signals via wireless or landline connections. The communicating device 210 performs CAN communication with a vehicle device.

The storage 220 stores information received through vehicle-to-vehicle communication, information calculated by the platooning control apparatus 200, and the like. The storage 220 may include a non-transitory memory, such as a flash memory type, a hard disk type, a micro type, or a card type (for example, a secure digital (SD) card or an extreme digital (XD) card), and a storage medium of at least one of memories, such as a random access memory (RAM), a static RAM (SRM), a read-only memory (ROM), a programmable ROM (PROM), an electrically erasable PROM (EEPROM), a magnetic RAM (MRAM), a magnetic disk, and an optical disk.

The controller 230 may control overall operations of the elements of the platooning control apparatus 200.

The platooning path generating module 240 of processor 300 generates a platooning path including a platooning start time point, a merge point, and an arrival point when the platoon is formed.

The weather environment determining module 250 of processor 300 determines a weather environment on the platooning path. That is, the weather environment determining module 250 may receive weather forecast information from the control center 400 or acquire weather information by using a result measured by the detector 120 of the vehicle to determine a weather environment state and a road state (a road surface state) due to the weather environment state. For example, when the weather forecast information tells that it snows or rains on the platooning path and during the platooning, it may be determined that the weather environment is in a bad condition.

The platooning sequence control module 260 of processor 300 determines a platooning sequence based on the weather environment state. That is, the platooning sequence control module 260 may determine a platooning sequence by complexly considering one or more of a weight of a load, a platooning path, a fuel ratio, and a braking force when the weather environment is in a normal condition. For example, a vehicle having a weak braking force, a bad fuel ratio, and a heavy load may be selected as a leading vehicle, and a vehicle having a strong braking force, a good fuel ratio, and a light load may be located on the rear side because it may rapidly cope with emergent braking.

Meanwhile, when the weather environment is in a bad condition, such as snow or rain, the platooning sequence control module 260 may determine a platooning sequence based on a braking force. That is, the platooning sequence control module 260 selects a vehicle having the weakest braking force as a leading vehicle when the weather environment is in a bad condition, then determines a vehicle having the second weakest braking force as the first following vehicle that is immediately on the rear side of the leading vehicle, and determines the sequences of the other following vehicles in the sequence of weak braking forces. That is, because the braking distance may become longer when the road is in a wet state due to snow or rain, the vehicle having a weak braking force may collide with the leading vehicle as it cannot be properly braked so that the vehicle having the best braking force is located on the rearmost side when the weather environment is in a bad condition.

The platooning level control module 270 of processor 300 determines a level of the platooning. Then, the level of the platooning may be determined by using various methods that consider various general conditions, such as the number of the platooning vehicles, the weights of the loads of the platooning vehicles, a distance of the platooning path, and whether the road is in construction. In the present disclosure, the levels of the platooning are classified into a first level Lv. 1 of not carrying out platooning, a second level Lv. 2 of controlling only a longitudinal vehicle-to-vehicle distance during the platooning, and a third level Lv. 3 of controlling a longitudinal vehicle-to-vehicle distance, a transverse vehicle-to-vehicle distance, and steering during the platooning. That is, the platooning level control module 270 determines the level of the platooning as a first level in a situation in which platooning is almost impossible (in the case in which the weather is very bad or the like), determines the level of the platooning as a second level in a state in which only the longitudinal vehicle-to-vehicle distance may be controlled through control of the platooning because the platooning is possible but the control of the transverse vehicle-to-vehicle distance may be dangerous, and determines the level of the platooning as a third level at which all controls related to platooning may be possible when the weather environment is good.

The platooning level control module 270 may determine the level of the platooning according to the level of the road determined by the road level determining unit 280. For example, the longitudinal vehicle-to-vehicle distance is controlled to m if the level of the road is a first level, the longitudinal vehicle-to-vehicle distance may be controlled to 15 m if the level of the road is a second level, and the longitudinal vehicle-to-vehicle distance may be controlled to 20 m if the level of the road is a third level. That is, a higher level of the road means a case in which the road state is worse because the weather state is bad, and if the level of the road is the third level, the vehicle-to-vehicle distance is controlled to 20 m, which is longest, because the state of the road is worst (a wet road surface).

The road level determining module 280 of processor 300 determines a state of a traffic line and a level of the road based on the weather information and the road information measured by the detector 120. Then, the road level determining unit 280 may recognize a state of the traffic line from image data of the camera system 121. The road level determining module 280 may determine a level of the road by using one or more of a slip rate of an electronic stability control (ESC) device and a state of the traffic line of the road after detection of snow and rain by a vehicle sensor (the detector). Further, when the platooning level is the third level, the road level determining module 280 may determine a state of the traffic line of the road on the platooning path.

The platooning control module 290 of processor 300 controls platooning according to the level of the platooning determined by the platooning level control module 270. Then, the control of the platooning means control of the speeds of the vehicles, the longitudinal vehicle-to-vehicle distance, and the transverse vehicle-to-vehicle distance. The platooning control module 290 does not carry out platooning if the level of the platooning is the first level, performs the control of the longitudinal vehicle-to-vehicle distance if the level of the platooning is the second level, and performs the control of the longitudinal vehicle-to-vehicle distance, control of the transverse vehicle-to-vehicle distance, and control of steering if the level of the platooning is the third level.

Further, the platooning control module 290 controls the transverse and longitudinal vehicle-to-vehicle distances according to the state of the traffic line and the level of the road determined by the road level determining module 280 as well as the level of the platooning. That is, the platooning control module 290 performs LFA control of maintaining the vehicle in the lane independently from the behavior of the lead vehicle when the state of the traffic line is good (a first reference value or more), and performs LV following control of following the lead vehicle if the state of the traffic line of the road is not good (less than the first reference value). Then, the path and the speed of the leading vehicle may be followed through the radar device 122 that is less influenced by the LV following traffic line and the weather environment.

The platooning control module 290 may determine a first distance value (for example, 10 m) as a longitudinal vehicle-to-vehicle distance if the level of the road is good (not less than a second reference value) and determine a second distance value (for example, 20 m) that is increased from the first distance value as the longitudinal vehicle-to-vehicle distance if the level of the road is bad (less than the second reference value) so that safety may be secured during emergent braking by increasing the longitudinal vehicle-to-vehicle distance when the level of the road is not good. The platooning control module 290 may switch off the camera system 121 on the front or lateral side of the vehicle if the level of the platooning is the second level in which only control of longitudinal vehicle-to-vehicle distance is controlled or when the level of the road is bad (less than the second reference value). That is, in the case in which the level of the platooning is the second level and the level of the road is bad, the camera system 121 may misrecognizes the front object nonetheless to influence the determination of the situation and the camera system 121 is switched off to reduce the usage of a battery.

In this way, a platooning sequence and a platooning level may be determined in consideration of a weather environment, and a longitudinal vehicle-to-vehicle distance and a transverse vehicle-to-vehicle distance may be controlled to prevent an accident due to the weather environment.

Further, according to one aspect of the present disclosure, the platooning control module 290 may switch off the camera system 121 and downgrade the platooning level to a lower level to restrict the control of the platooning when it rains, thereby decreasing an accident rate.

Further, according to one aspect of the present disclosure, the platooning control module 290 may secure safe driving by increasing a longitudinal vehicle-to-vehicle distance or by changing independent control to control of following of a leading vehicle in the transverse direction in the case in which the state of the traffic line or the level of the road is not good even if the level of the platooning is an upper level.

Figure 4:
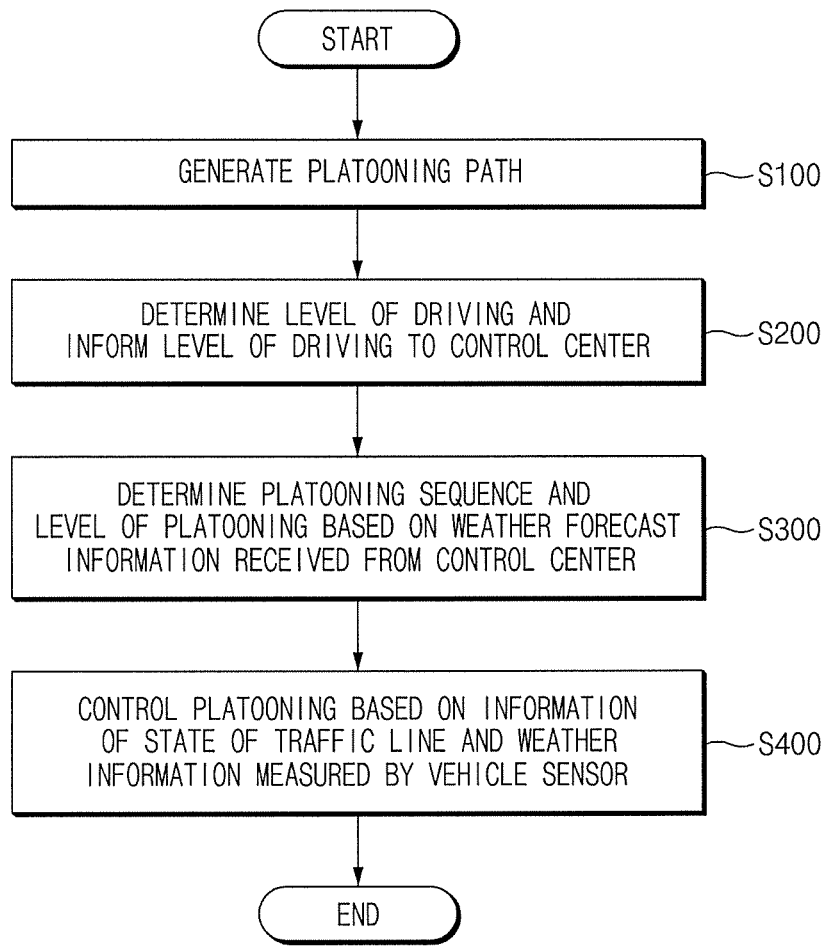
FIG. 4 is a flowchart illustrating a method of controlling platooning based on a weather environment information according to an embodiment of the present disclosure.

Hereinafter, a method for controlling platooning based on a weather environment according to an embodiment of the present disclosure will be described with reference to FIG. 4. FIG. 4 is a flowchart illustrating a method of controlling platooning based on a weather environment according to an embodiment of the present disclosure.

Referring to FIG. 4, the platooning control apparatus 200 generates a platooning path if receiving a request for platooning through the control center 400 or the driver switch 140 (S100), and determines the level of platooning in consideration of a whole area path, the weight of a load of the vehicle, a fuel ratio, and a braking force and informs the determined level of the platooning to the control center 400 (S200).

Thereafter, the platooning control apparatus 200 receives weather forecast information from the control center 400, and determines a platooning sequence and a level of platooning based on the received weather forecast information (S300).

Subsequently, the platooning control apparatus 200 controls the platooning based on the traffic line state information and the weather information measured by the vehicle sensor (detector) (S400).

Figure 5:
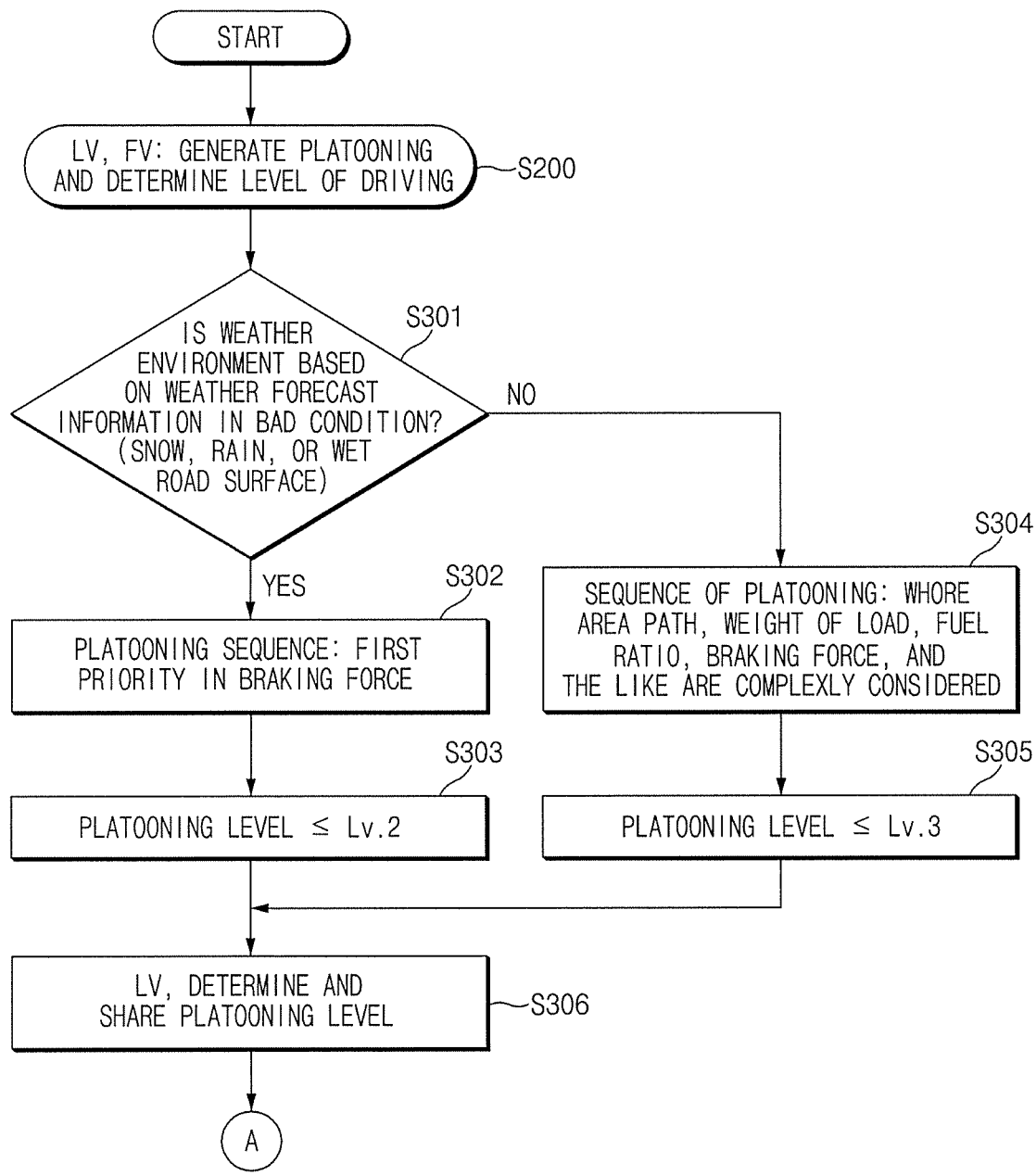
FIG. 5 is a flowchart illustrating the method of FIG. 4 in detail.

Hereinafter, the method (S300) of controlling platooning based on the weather forecast information in FIG. 4 will be described with reference to FIG. 5. FIG. 5 is a flowchart illustrating the method of FIG. 4 in detail.

Referring to FIG. 5, the platooning control apparatus 200 determines generation of platooning and a level of the platooning (S200), and determines whether the weather environment is in a bad condition, for example, in which the surface of the road is wet due to snow or rain by using the weather forecast information received from the control center 400 (S301).

When the weather environment is in a bad condition, the platooning control apparatus 200 determines the platooning sequence while taking the braking force as a first priority (S302). That is, while the braking force is considered first, the vehicle having the weakest braking force is located as a leading vehicle and the vehicle having the strongest braking force is located on the rearmost side.

Thereafter, the platooning control apparatus 200 determines the level of the platooning as not more than a second level at which the control of the platooning is restricted to control of a longitudinal vehicle-to-vehicle distance (S303).

Thereafter, the platooning control apparatus 200 determines the level of the platooning as one of the first level or the second level and shares the level of the platooning with the other platooning vehicles and the control center 400 (S306).

Meanwhile, if it is determined in operation S301 that the weather environment does not correspond to a bad weather condition, the platooning sequence is determined by complexly considering a whole area path, a fuel ratio, a braking force, and the weight of a load (S304).

Subsequently, the platooning control apparatus 200 determines the level of the platooning as not more than a third level because the weather situation is good (S305). Thereafter, the platooning control apparatus 200 determines the level of the platooning as one of the first to third levels and shares the level of the platooning with the other platooning vehicles and the control center 400 (S306).

Figure 6:
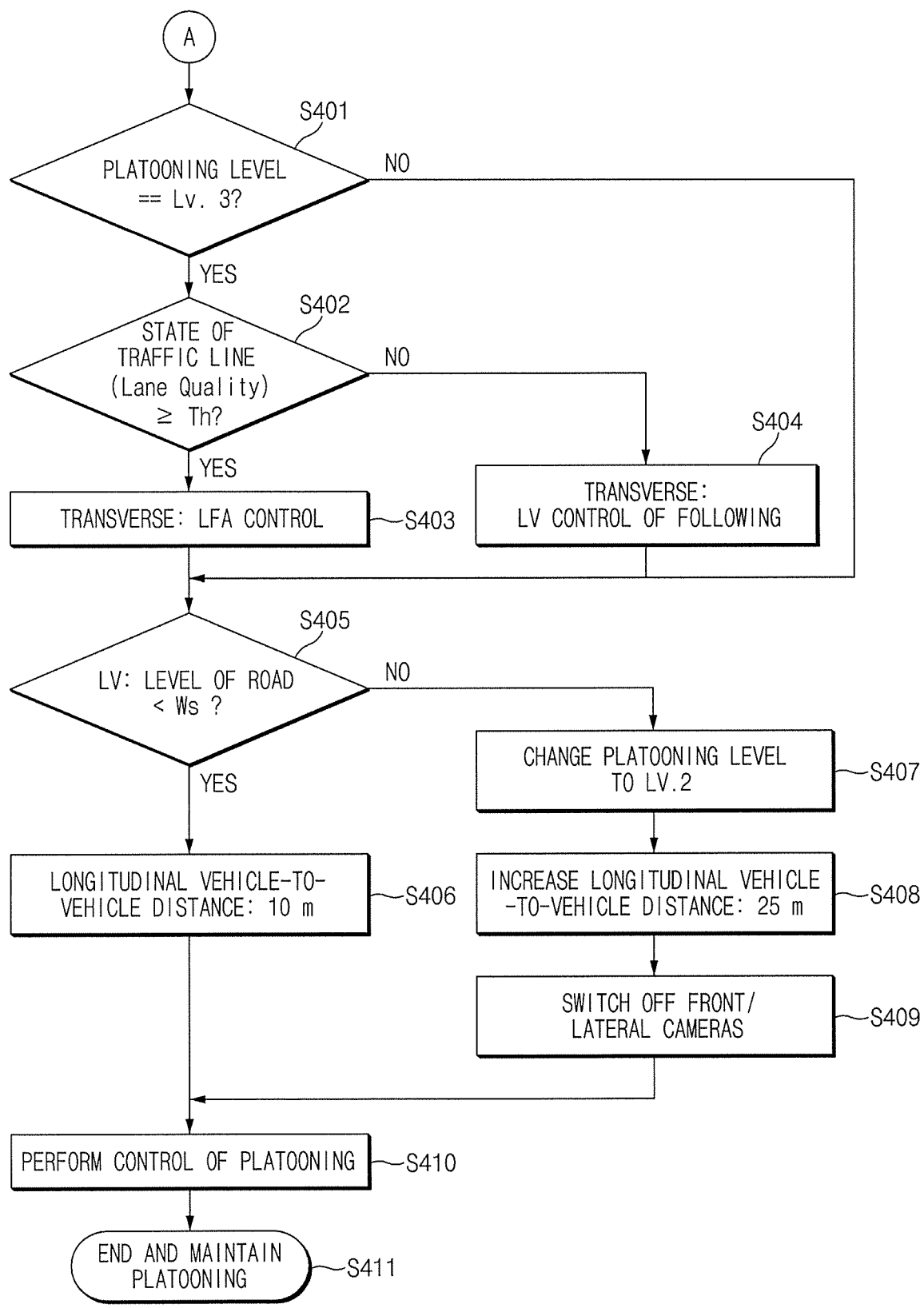
FIG. 6 is a flowchart illustrating the method for controlling platooning based on weather information measured by a vehicle sensor of FIG. 4.

Hereinafter, the method (S400) of controlling platooning based on the weather information measured by the vehicle sensor of FIG. 4 will be described with reference to FIG. 6. FIG. 6 is a flowchart illustrating the method for controlling platooning based on weather information measured by the vehicle sensor of FIG. 4.

First, the platooning control apparatus 200 determines whether the level of the platooning is a third level (S401), and determines the state of the traffic line when the level of the platooning is the third level (S402). This is because the transverse control level may be adjusted when the traffic line state recognition rate is not good even if the level of the platooning is an uppermost level.

If the state of the traffic line is not good, that is, if the traffic line recognition rate is good in operation S402, the platooning control apparatus 200 performs independent control (LFA control) for maintaining driving in the traffic line independently from the behavior of the leading vehicle as control of the transverse vehicle-to-vehicle distance (S403), and if the state of the traffic line is not good, that is, the traffic line recognition rate is bad, the platooning control apparatus 200 performs control (LV control) for following the leading vehicle as control of the transverse vehicle-to-vehicle distance (S404).

Subsequently, the platooning control apparatus 200 determines whether the level of the road is smaller than a predetermined reference value Ws (S405), and determines that the state of the road is good if the level of the road is smaller than the predetermined reference value to control the longitudinal vehicle-to-vehicle distance to not more than 10 m (S406).

Meanwhile, the level of the road is equal to or larger than the predetermined reference value Ws, the platooning control apparatus 200 determines that the state of the road is a bad condition and changes the level of the platooning to a second level (S407) and increases the longitudinal vehicle-to-vehicle distance to 20 m to control the longitudinal vehicle-to-vehicle distance (S408).

Thereafter, the platooning control apparatus 200 switches one or more cameras mounted on front and lateral sides of the vehicle having a high misrecognition rate in a bad weather condition, and drives only a radar device having a relatively low error rate even if it snows or rains (S409).

Thereafter, the platooning control apparatus 200 performs control of the platooning by applying the determined control of the longitudinal vehicle-to-vehicle distance and transverse vehicle-to-vehicle distance (S410), and maintains the platoon after performing the control of the driving (S411).

Because platooning is a scheme of traveling along the same path while maintaining a short vehicle-to-vehicle distance and safety is the most important factor, in the present disclosure, weather and road environments are provided to the driver in advance during platooning and thus the control of the level of the platooning, the longitudinal vehicle-to-vehicle distance, and the transverse vehicle-to-vehicle distance is restricted when the weather is in a bad condition according to a situation, thereby improving safety. Further, when degradation of the recognition rate of the camera is predicted when the weather is not good, for example, when it rains, the accident rate may be minimized by switching off the camera and downgrading the level of the platooning.

Further, safety may be improved by determining weather and road environments during the current driving by using the sensor (detector) and increasing the longitudinal vehicle-to-vehicle distance even if the level of the platooning is an upper level in the case of a disadvantageous condition of a specific level or more.

Figure 7:
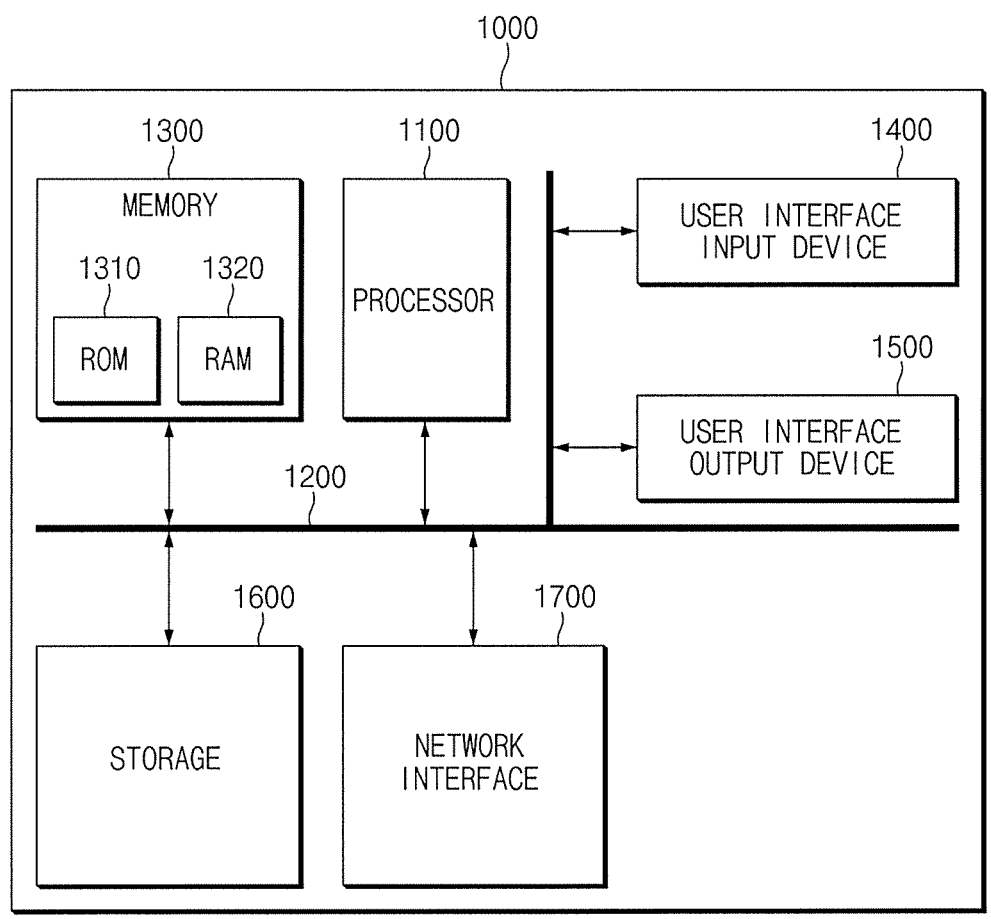
FIG. 7 is a diagram of a computer system to which the method for controlling platooning based on a weather environment according to an embodiment of the present disclosure is applied.

FIG. 7 is a diagram of a computer system to which the method for controlling platooning based on a weather environment according to an embodiment of the present disclosure is applied. Referring to FIG. 7, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present technology may improve a safety of driving by performing a level of platooning, control of a longitudinal vehicle-to-vehicle distance, and control of a transverse vehicle-to-vehicle distance in consideration of a weather environment.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for controlling platooning, the apparatus comprising a processor configured to:
   determine a weather environment state on a platooning path based on weather forecast information received from a control center or weather information measured by a vehicle sensor;
   determine a sequence of platooning based on the weather environment state;
   determine a level of the platooning based on the weather environment state; and
   perform control of a transverse vehicle-to-vehicle distance or control of a longitudinal vehicle-to-vehicle distance of a vehicle based on the measured weather information and the determined level of the platooning,
   wherein the processor is further configured to determine the sequence of platooning based on a platooning path, a fuel ratio, a braking force, and a weight of a load when the weather environment state is a normal condition, and to determine the sequence of platooning based on the braking force when the weather environment state is a bad condition.

2. The apparatus of claim 1, wherein the processor is further configured to:
   determine a level of a road based on the measured weather information.

3. The apparatus of claim 2, wherein the processor is configured to control the longitudinal vehicle-to-vehicle distance according to the determination result of the level of the road.

4. The apparatus of claim 1, wherein the processor is further configured to:
   generate the platooning path, wherein the platooning path includes a merge point for the platooning.

5. The apparatus of claim 4, wherein the processor is configured to determine that the weather environment state is a bad weather condition in the case in which the road is in a wet road surface state due to at least one of snow, rain, and hail in the platooning path.

6. The apparatus of claim 1, wherein the processor is configured to select a vehicle having a weakest braking force as a leading vehicle when the weather environment state is a bad condition, and to determine the sequence of the following vehicles in a sequence of stronger braking forces.

7. The apparatus of claim 2, wherein the processor is configured to classify the level of the platooning into a first level of not carrying out platooning, a second level of controlling a longitudinal vehicle-to-vehicle distance during the platooning, and a third level of controlling a longitudinal vehicle-to-vehicle distance, a transverse vehicle-to-vehicle distance, and steering during the platooning to determine the level of the platooning.

8. The apparatus of claim 7, wherein the processor is configured to determine that the level of the platooning is the first level or the second level in the case in which the weather environment state is a bad condition, and determine that the level of the platooning is one of the third level, the second level, and the first level in the case in which the weather environment state is a normal condition.

9. The apparatus of claim 8, wherein the processor is configured to determine a state of a traffic line of the road on the platooning path when the level of the platooning is the third level.

10. The apparatus of claim 9, wherein the processor is configured to perform independent control for maintaining driving in the traffic line independently from a behavior of the leading vehicle in the case in which the traffic line state of the road is a first reference value or more, and perform the traffic line state of the road is less than the first reference value.

11. The apparatus of claim 10, wherein the processor is configured to determine the level of the road by using one or more of a slip rate of an electronic stability control (ESC) device and the traffic line state of the road according to the detection result of snow and rain by the vehicle sensor.

12. The apparatus of claim 11, wherein the processor is configured to determine a first distance value as the longitudinal vehicle-to-vehicle distance in the case in which the level of the road is a second reference value or more, and determine a second distance value that is larger than the first distance value as the longitudinal vehicle-to-vehicle distance in the case in which the level of the road is less than the second reference value.

13. The apparatus of claim 12, wherein the processor is configured to adjust the level of the platooning to the second level in the case in which the level of the road is less than the second reference value.

14. The apparatus of claim 13, wherein the processor is configured to switch off one or more cameras on front and lateral sides of the vehicle in the case in which the level of the platooning is the second level and the level of the road is less than the second reference value.

15. A system for controlling platooning, the system comprising:
a communicating device configured to perform communication between platooning vehicles;
a detector configured to detect weather information on a platooning path; and
a platooning control apparatus configured to determine a weather environment state based on weather forecast information received from a control center or weather information detected by the detector and control platooning by determining a level of the platooning according to the weather environment state,
wherein the platooning control apparatus is configured to determine a sequence of platooning based on a platooning path, a fuel ratio, a braking force, and a weight of a load when the weather environment state is a normal condition, and to determine the sequence of platooning based on the braking force when the weather environment state is a bad condition.

16. The system of claim 15, wherein the platooning control apparatus includes a processor configured to:

generate a platooning path;
determine a weather environment state on the platooning path based on the weather forecast information or the weather information;
determine the sequence of platooning based on the weather environment state;
determine a level of the platooning based on the weather environment state;
perform control of a transverse vehicle-to-vehicle distance or a longitudinal vehicle-to-vehicle distance of a vehicle based on the detected weather information and the determined level of the platooning; and
determine a level of a road based on the measured weather information.

17. A method for controlling platooning, the method comprising:
determining, by a processor, a platooning sequence and a level of platooning based on weather forecast information received from a control center;
determining, by the processor, a state of a traffic line of a road on a platooning path based on weather information measured by a vehicle sensor communicatively connected to the processor;
performing, by the processor, control of a transverse vehicle-to-vehicle distance according to a state of the traffic line;
determining, by the processor, a level of the road based on the weather information; and
performing, by the processor, control of a longitudinal vehicle-to-vehicle distance according to a level of the road,
wherein the determining a platooning sequence includes:
determining the platooning sequence based on a platooning path, a fuel ratio, a braking force, and a weight of a load when the weather environment state is a normal condition; and
determining the platooning sequence based on the braking force when the weather environment state is a bad condition.

18. The method of claim 17, wherein the performing control of a transverse vehicle-to-vehicle distance includes:
performing independent control for maintaining driving of the vehicle in the traffic line independently from a behavior of a leading vehicle in the case in which the traffic line state of the road is a first reference value or more; and
performing control for following the leading vehicle in the case in which the traffic line state of the road is less than the first reference value.

19. The method of claim 18, wherein the performing control of a longitudinal vehicle-to-vehicle distance includes:
determining a first distance the road is a second reference value or more; and
determining a second distance value that is larger than the first distance value as the longitudinal vehicle-to-vehicle distance in the case in which the level of the road is less than the second reference value.

* * * * *